Nov. 28, 1967   W. PENNINGTON ET AL   3,354,706
PROPULSOR MEASUREMENT SYSTEM
Filed March 1, 1967   2 Sheets-Sheet 1

*INVENTORS*
WILLIAM PENNINGTON
PETER PRICE
YING-NIEN YU

ATTORNEYS

INVENTORS
WILLIAM PENNINGTON
PETER PRICE
YING-NIEN YU
ATTORNEYS

United States Patent Office 3,354,706
Patented Nov. 28, 1967

3,354,706
PROPULSOR MEASUREMENT SYSTEM
William Pennington, 3834 Crestway Drive, Los Angeles, Calif. 90043; Peter Price, 3346 Grayburn Road, Pasadena, Calif. 91107; and Ying-Nien Yu, 634 Kelton Ave., West Los Angeles, Calif. 90024
Filed Mar. 1, 1967, Ser. No. 629,846
15 Claims. (Cl. 73—116)

ABSTRACT OF THE DISCLOSURE

A force-measuring device including an electro-dynamic forcer having a constant magnetic field reacting upon an armature secured to the propulsor. Armature current is used to keep the electrodynamic forcer stationary, with the magnitude of the current indicating the force of the propulsor. A position transducer generates the error signal for controlling the armature current, with the reference portion of the transducer carried by an inertial reference.

Background of the invention

*Field of the invention.*—This invention is in the field of jet reaction propulsor measurement.

*Description of the prior art.*—In the testing of high thrust to mass ratio propulsors, such as chemical rocket motors, it has been the practice in the past to base thrust measurements on the elastic deformation of a restraining element. In other words, the conventional load cell predicates thrust measurement upon the deformation of an elastic column resisting the force generated by the propulsor. This type of measuring arrangement has distinct shortcomings. The accuracy, calibration retention and useful measurement range of such systems is limited by the elastic properties of the material of the load cell. This is influenced by temperature sensitivity, aging, hysteresis, nonlinearity, and changes under cycling conditions. Furthermore, conventional systems possess relatively low natural frequencies. This means that there are series distortions of the transient components of the propulsor force encountered during start-up and shutdown. The oscillatory portions of the propulsor force likewise are distorted by the low natural frequencies of conventional systems. In addition, vibrations are often transmitted to the system from its exterior environment (e.g., vibrations from the exhauster system of a simulated altitude test cell). No matter what steps are taken toward isolation in the usual measuring stand, these exterior vibrational forces will be received and generally will be indistinguishable from vibrations directly induced by the propulsor under test. This has caused a further inaccuracy. Moreover, passive measurements of the conventional system allow no provision for simulating the environment that the rocket motor or other propulsor will encounter during actual service. It has not been possible to impose the aerodynamic forces, vibrational loads, mechanical impedances, and other environmental conditions that the propulsor will encounter when it is used to propel a vehicle.

Another type of system has been utilized in the past for propulsive devices having a very low ratio of thrust to mass. These may be electrical propulsors for deep space penetration. This test system utilizes a solenoid in a constant magnetic field in opposition to the thrust of the propulsor. The forces are balanced by regulating the solenoid current to hold the solenoid, which is attached to the propulsor, at a virtually fixed position. Hence, this system includes a servo loop with a position transducer as an error signal source. This type of system has certain advantages over the equipment used for testing propulsors of high thrust to mass ratio. However, up to now these systems have been usable only for steady state or nearly steady state measurements. The coupling to exterior vibrations and compliances existing in such a system produces severe vibration and oscillation if system gain is raised to the point necessary for good transient and frequency response, even by conventional elastic deformation type measurement system standards. Such systems are also incapable, as conventional systems, of simulating the mechanical environment to which the propulsor will be ultimately subjected in flight.

Summary of the invention

The present invention provides a superior system for measuring the characteristics of propulsors of all types. This includes high thrust to mass ratio chemical rockets. It possesses greater sensitivity and accuracy and is more versatile than previously devised testing systems. The design of this invention includes a force generator whose output can be measured and controlled, for example an electrodynamic forcer having a constant magnetic field reacting upon an armature secured to the rocket or other propulsive device. The armature current is used to maintain this member substantially stationary, and the magnitude of this current indicates the force generated and hence the opposing thrust of the rocket. A position transducer is utilized for generating the error signal. The servo loop employed is of high response type so that transient conditions can be measured with accuracy. The reference part of the transducer is carried by an inertial reference which isolates the measuring system against exteriorly applied vibrational forces. The inertial reference preferably consists of a lightly damped seismic mass. Provision is made for moving the constant field to permit acceleration measurements as the propulsor, bearing the armature, is allowed to move translationally. Flight conditions can be simulated by imparting appropriate signals to the system of the electromagnetic forcer. A positioning servo is included in the system to hold constant the relative position between the forcer field coil and the armature, so that the forcer need not have an extremely long constant force range of stroke.

It is an object of this invention to provide a device which will measure the thrust of a reaction propulsor with superior accuracy and through a wide range of values.

Another object of this invention is to provide a measurement system more sensitive than prior designs, capable of measuring transient conditions that hitherto could not be determined.

Another object of this invention is to provide a measuring system that can determine mass values during the test, can measure the acceleration capability of the propulsor, and which can simulate the effects of vehicle inertias and compliances as well as aerodynamic forces.

A still further object of this invention is to provide a propulsor measurement system which is isolated from deleterious environmental effects.

An additional object of this invention is to provide a test system capable of measuring values that hitherto could not be determined.

A still further object of this invention is to provide a propulsor test system having provisions to allow substantial movement of the propulsor during test.

These and other objects will become apparent from the following detailed description taken in connection with the accompanying drawing.

*Description of the preferred embodiment*

Figure 1:
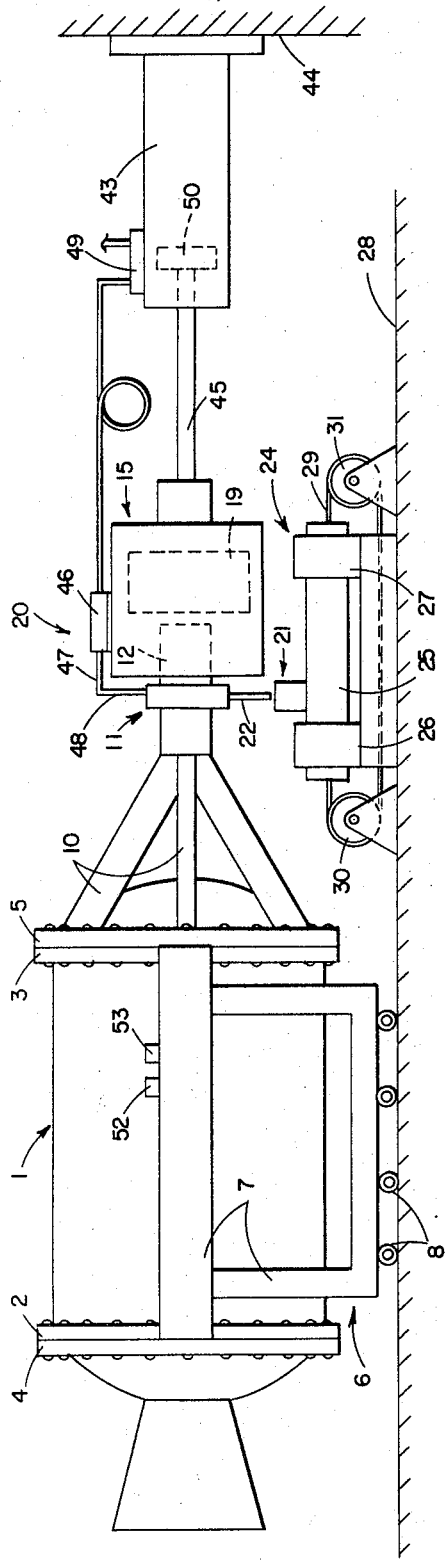
FIGURE 1 is a side elevational view of the test system of this invention.

With reference to the drawing, there may be seen in FIGURE 1 the basic components of the device of this invention. It is illustrated for testing where there is one degree of freedom (i.e. permitting measurements in one direction only), but the system can be adapted for testing with up to six degrees of freedom. A rocket motor 1, or other jet propulsion reactor, is equipped with flanges 2 and 3 which are bolted to matching flanges 4 and 5 of a cradle 6 that supports the propulsor. Suitable structural members 7 interconnect the flanges 4 and 5 and provide a base for the cradle. This cradle is movable through a rectilinear path permitted by a tangential force decoupling arrangement, for example, by a plurality of rollers or wheels 8 that support the unit. The rollers are constructed to minimize the frictional resistance to movement of the cradle 6.

Figure 2:
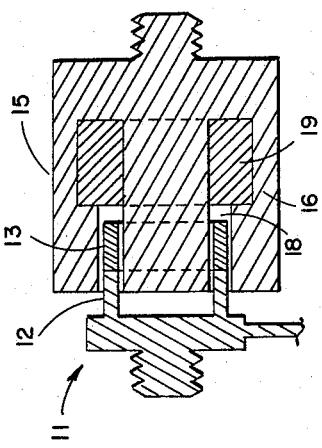
FIGURE 2 is an enlarged longitudinal sectional view of the forcer for resisting the thrust of a propulsor under test.

Extending from the front flange 5 is a force transmitting structure, for example, beams 10 which connect to an armature 11. The armature is constructed of nonmagnetic metal and includes a short tubular extension 12 that carries a winding 13 (see FIGURE 2). This portion of the armature extends into a field 15. The latter component includes a core 16 of magnetic material having an annular recess 18 in one end that receives the armature extension 12 and its coil 13. A field coil 19 maintains the core in a highly oversaturated condition. While constructed as an electromagnet in the normal embodiment, the use of a permanent magnet also is possible.

It can be seen, therefore, that the interaction of the field of the armature winding with the magnetic flux of the field creates a force which can be used to resist the thrust of the rocket motor 1 or other jet reaction propulsor. Together, therefore, the armature and field provide a forcer 20 which can balance the thrust produced by the engine under test.

During thrust measurements the armature 11 is maintained virtually motionless. This is accomplished by means of a servo loop that includes a position transducer 21. This transducer, connecting by arm 22 to the armature, produces a signal for varying the armature magnetic field. In other words, as a result of the signal from the transducer 21, the current through the armature winding is controlled so that the opposing force produced will balance the thrust of the propulsor 1. Armature current, therefore, is proportional to and gives a reading of the thrust produced by the propulsor 1.

Accuracy of measurement of the propulsor thrust requires that the position transducer be isolated from environmental conditions. Vibrational forces or the like from the surroundings should not be received by the position transducer, which could not distinguish such forces from those produced by the reactor under test. This isolation is accomplished by mounting the transducer on an inertial reference, which may be in the form of a lightly damped seismic mass 24. While such a unit is subject to movement from low amplitude oscillations of very low frequency, these displacements produce only negligible errors in the measurement of the usual high thrust to mass ratio propulsor. Basically, therefore, the reference side of the position transducer becomes a nearly ideal inertial reference.

Figure 3:
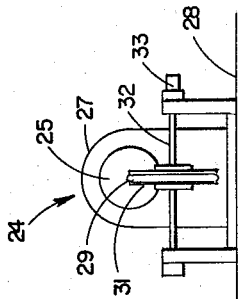
FIGURE 3 is an end elevational view of the seismic mass unit.

The seismic reference may include a mass 25, which may be in the form of a heavy bar weighing around one thousand pounds. Its ends are mounted in low friction fluid bearings 26 and 27 supported on the floor 28 of the test cell. A wire 29 extends from the opposite ends of the mass 25 around pulleys 30 and 31. The rotational resistance of these pulleys is controlled by mounting them on torsion axles such as the torsion axle 32, seen in FIGURE 3. An adjustment nut 33 is included for accurately controlling the tension on the axle, which may be constructed of piano wire.

Figure 4:
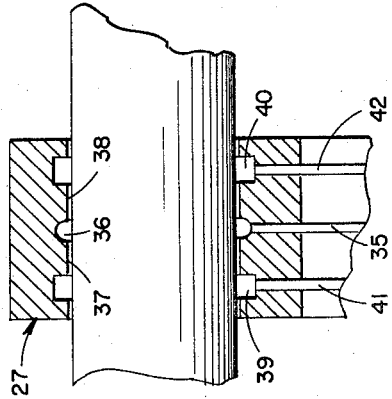
FIGURE 4 is an enlarged longitudinal sectional view of a fluid bearing used in supporting the seismic mass.

The fluid bearings may take a variety of forms to assure a minimum of friction at the point of support of the bar 25. As seen in FIGURE 4, the bearing includes a fluid inlet 35 communicating with an annular recess 36 from which the fluid can flow across lands 37 and 38 to additional annular recesses 39 and 40. The fluid then flows outwardly through lines 41 and 42. Typically, the fluid may be air entering at approximately one hundred pounds per square inch absolute.

During the course of various tests of the propulsor 1, it is necessary to allow the propulsor to move on its carriage for some distance. At times this may amount to travel of several feet. This is done, for example, during acceleration and mass determinations of the propulsor. It is possible to construct the armature 11 and field 15 in such a manner that movement of this magnitude can be accommodated. However, it is quite expensive to build these components in this way, so that economically it is not feasible to allow movement solely through the forcer unit.

Nevertheless, with the provisions of this invention, the propulsor is allowed to move almost any desired distance with a relatively simple and low cost arrangement. This is in the form of a positioner for the forcer unit 20 that moves the field 15 ahead of the propulsor, while maintaining the armature 11 substantially motionless with respect to the field. The positioner need not have the high frequency response of the forcer, which allows it to be relatively uncomplicated in nature.

The positioner may take a variety of forms depending upon the requirements of the test system installation. While the positioner may be electromechanical or pneumatic, particularly satisfactory is the unit illustrated which is hydraulically operated and controlled, being similar to the tracer control systems commonly used such as in the machine tool art. This includes a pressure cylinder 43 which is supported by fixed structure 44. From cylinder 43 projects a piston rod 45 that engages the field 15. Carried on the field 15 is a small control cylinder 46 from which extends a piston rod 47. The end of rod 47 engages actuator arm 48 which extends upwardly from the armature 11. Tracer cylinder 46 includes a fluid connection to valve 49 that directs the application of hydraulic pressure to either side of the piston 50 in cylinder 43.

In operation, therefore, with the position transducer 21 rendered inoperative, the propulsor 1 will move to the right on its carriage 6. When this occurs, the armature 11 will tend to enter further into field 15. As this takes place the transducer formed by the tracer cylinder 46 and its piston rod 47 will transmit a signal to the valve 49, in turn causing the piston 50 to withdraw rod 45. Hence, the forcer is backed away from the advancing propulsor, and the armature and field are maintained in a relatively fixed relationship as the propulsor moves. During this movement of the propulsor, a predetermined amount of current, which may vary appropriately with time, may be fed through the armature. This current can be computed to represent an opposing force such as the propulsor will encounter during actual service. The force so produced may be either positive or negative, and can represent vehicle mass, taking into account the weight of the items moving with the propulsor in the test bed. Other forces representing vehicle aerodynamic loads or the like can be applied.

At the end of the stroke of the propulsor advancement, the cylinder 43 will be caused to stop its movement and return the components to their original positions. The system then is ready immediately for any type of further testing that is desired during the time that the propulsor is producing its thrust.

This basic system permits numerous and accurate measurements of the characteristics of the propulsion unit under test. First of all, it allows thrust to be determined by the current flow through the armature as mentioned above. The use of an inertial reference for the position transducer assures an accuracy of measurement and isolates the system from unwanted environmental forces. The positioning servo system used in conjunction with the armature field and transducer is of a high transient response type. Appropriate conditioning of the signal from the propulsor position transducer will simulate the mechanical impedance to vibration seen by the propulsor in the vehicle in which it is to fly so that thrust measurements can be made under the conditions of use.

Acceleration measurements also are possible with the system of this invention. This is accomplished by turning off the null position servo of the force balance unit. The propulsion 1 then is allowed to move on its cradle for a short distance as described above, while its acceleration is measured. Accelerometer 52 and velocimeter 53 are included with the propulsor on the cradle 6 to give necessary readings during the translation of the propulsor.

Obviously, thrust and acceleration cannot be measured simultaneously because of the movement allowed the propulsor during the acceleration determination. However, they can be found alternatively so as to give a complete series of measurements during a test run. This will permit establishing a curve for each which will allow accurate filling in of the gaps in measurement data.

The mass of the propulsor 1 can be found in three different ways utilizing the system of this invention. If acceleration and thrust are determined as outlined above, mass is determined by a simple division process. This is an application of Newton's second law of motion that mass equals force divided by acceleration.

Another way of obtaining mass is to again apply Newton's second law of motion. However, in this instance there is superimposed on the system at the forcer a known zero average oscillatory force which may be generated by a signal generator having an output at a frequency in the sonic or supersonic range. The frequency of the generator is selected at a value well below any resonant frequencies of the measurement system and away from any significantly strong frequency components of the propulsor thrust. The selected frequency is filtered from the forcer servo loop and selected from the accelerometer output by notch rejection and notch pass filters of conventional type.

The third method of mass determination is based upon the analogy of the forcer system to the characteristics of a spring. The servo system of the forcer is equivalent to a mechanical spring whose stiffness increases with gain. This gain can be varied to give the servo system the stiffness of any mechanical spring. It is known that for a moving mass M and a spring stiffness K, the natural frequency of the spring is expressed in the formula $$f = \frac{1}{2\pi}\sqrt{\frac{K}{M}}$$

where $f$ is the natural frequency. Therefore, the frequency response of the system is determined by observation, and a small frequency range is chosen where the response is substantially flat. Here the system will have no critical frequencies and the propulsor will produce only noise components. The amplifier gain then is adjusted to shift the servo natural frequency to this chosen range. This frequency range is notch filtered from the force balance position servo loop. It may be handled by a separate circuit in which the amplification to the electromagnetic forcer is servoed to hold the natural frequency of the system at a constant predetermined frequency in this range. The equivalent mechanical spring constant of the system is determined from the amplification given the displacement transducer signal. In other words, the amplifier gain at this selected natural frequency is a known value. This means that in the above set out formula the factor M. or mass, is the only unknown remaining. Therefore, again by a simple arithmetical solution, the propulsor mass is found.

Mass measurements by either the second or the third method can be made simultaneously with force or acceleration measurement.

Figure 5:
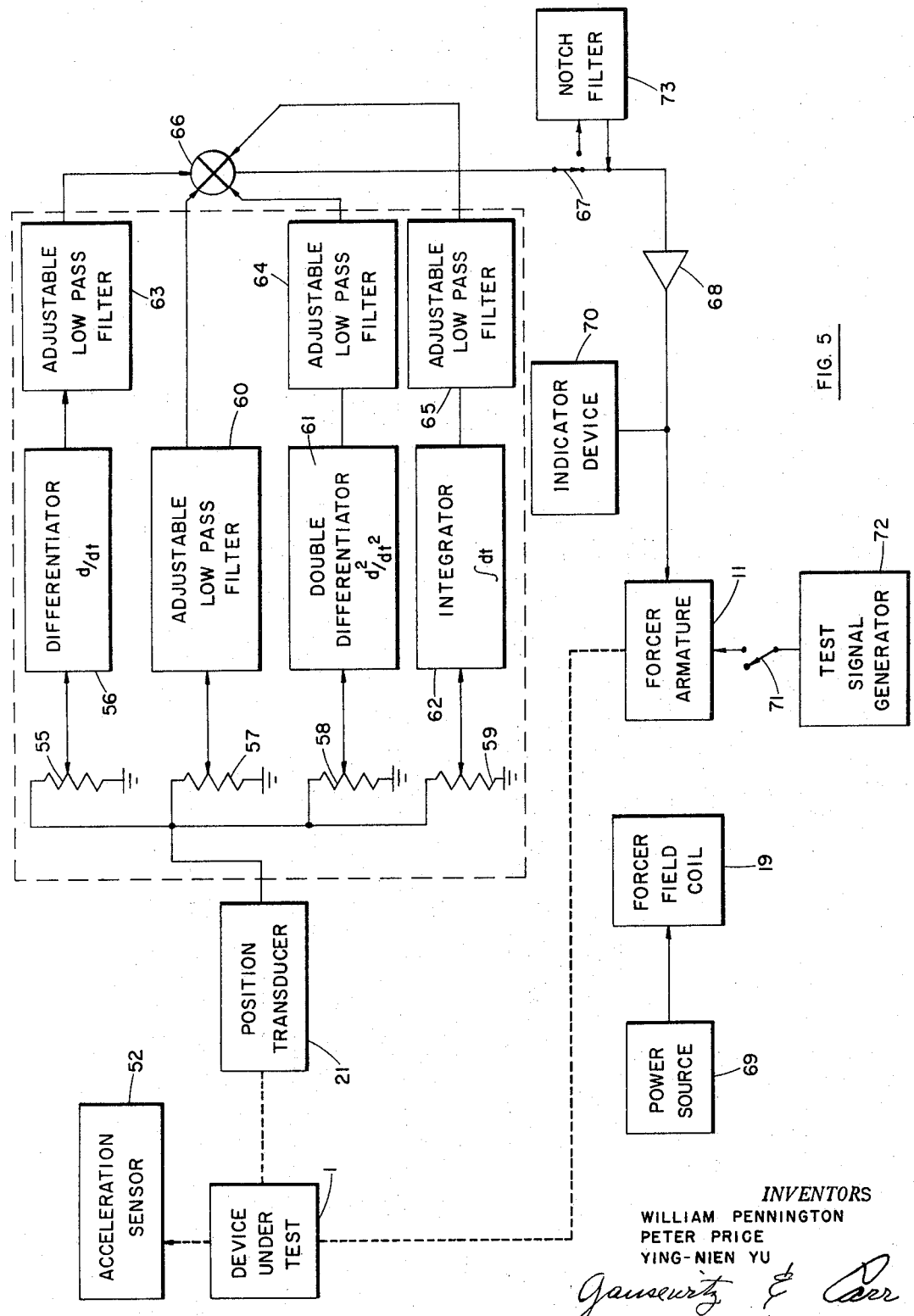
FIGURE 5 is a diagram of the electrical system used in connection with this invention.

With reference now to the electrical system diagram of FIGURE 5, as mentioned above, motion of the device 1 under test is sensed by position pickoff or transducer 21. This converts the displacement input to an electrical signal. Position transducer 21 may be of the magnetic, capacitive, or variable resistance type such as is well known in the art. The circuit includes a potentiometer 55 the output of which is fed to differentiator 56. The outputs of additional potentiometers 57, 58 and 59 are fed to the inputs of adjustable low pass filter 60, double differentiator 61 and integrator 62, respectively. Differentiators 56 and 61 and integrator 62 may be of conventional construction. The amplitude of the signal fed from the position transducer to each of the aforementioned components can be varied as desired by means of potentiometers 57, 58 and 59. Adjustable velocity damping is provided by means of potentiometer 55 and differentiator 56. Adjustable error rate feedback is obtained by means of potentiometer 58 and double differentiator 61, while adjustable integral control comes from potentiometer 59 and integrator 62.

The utilization of adjustable error rate feedback and adjustable integral control, in addition to the usual adjustable position error and adjustable velocity damping signals, enables this system to have high transient response. The output of potentiometer 57, which is fed to adjustable low pass filter 60, is the position error signal. The outputs of differentiator 56, double differentiator 61 and integrator 62 are fed, respectively, to adjustable low pass filters 63, 64 and 65. The frequency response of each of these filters is set to provide the best transient response possible with the particular combined mechanical characteristics encountered with test propulsor and the thrust stand. They may be adjusted experimentally for each test condition to satisfy this requirement. The design of such filters is well known in the art and is described, for example, in Chapter VI of "Communication Engineering" by W. L. Everitt published by McGraw Hill. Rather than high transient response, it will sometimes be desirable that the system have the same response as the structure to which the propulsor will be attached in the vehicle in which it is to be used. This can be accomplished with the present system by incorporating a number of duplicates of the block indicated on FIGURE 5 in which the low pass filters are replaced by suitably adjusted band pass filters and all blocks are connected in parallel.

The output of each of adjustable low pass filters 60, 63 and 64 and 65 is fed to summing device 66. The latter device, which may comprise summing resistors, adds these signals. The output of summing device 66 is fed through switch 67 to voltage and power amplifier 68 where the drive signal for forcer armature 11 is developed. Forcer field coil 19 receives a constant excitation current from power source 69. Forcer field coil 19 should be capable of producing a constant magnetic core for the coil which is highly oversaturated under normal operating conditions. It is to be noted, however, that the same effect may be achieved by utilizing a larger permanent magnet for supplying the field, or a cryogenic superconducting magnet.

Forcer armature 11 receives a current output from amplifier 68, which is in accordance with the displacement signal received by position transducer 21.

The magnetic force acting on armature 11 by virtue of the current flowing therein, and the coaction with the magnetic field produced by field coil 19, causes armature 11, which is mechanically coupled to the device 1 under est, to be held substantially in its initial resting position. It is to be observed, therefore, that under normal operating conditions forcer armature 11 maintains the test device 1 in a null balance position. There is, however, minute displacement of device 1 resulting from the thrust it produces. This movement is sensed by position transducer 21 and amplified by amplifier 68 to produce a force output from forcer armature 11 to maintain the null balance of the system. The current fed from amplifier 68 to armature 11 is measured by indicator device 70 which may comprise, for example, an accurately calibrated ammeter or more elaborate electrical recording equipment as desired. The current measured by indicator device 70 represents the force generated by the propulsor 1.

In making measurements of the mass of the device 1 under test in accordance with one technique, switches 7 and 71 are thrown from the presently indicated position to the position indicated by the dotted lines. This will provide a test signal to forcer armature 11 from test signal generator 72 and also will throw notch filter 73 in series with the servo loop. Notch filter 73 may comprise a relatively high Q parallel L–C circuit which is resonant at the output frequency of test signal generator 72. It can be seen that with the output of test signal generator 72, which may be in the sonic frequency range, fed to forcer armature 11 and this signal effectively filtered out of the servo feedback loop by means of notch filter 73, that the device 1 under test will be driven in open loop condition by forcer armature 11 at the test signal frequency.

The output frequency of test signal generator 72 should be one at which the mass of the device under test 1 appears rigid. This output signal should be accurately calibrated in terms of force. With the acceleration to which the device under test 1 is being subjected sensed by acceleration sensor 52, it can readily be seen that the mass of the device under test can be ascertained by dividing the measured force output signal from test signal generator 72 by the output of acceleration sensor 52 notch pass filtered at the signal generator frequency.

The foregoing detailed description is to be clearly understood as given by way of illustration and example only, the spirit and scope of this invention being limited solely by the appended claims.

We claim:

1. A device for testing a jet propulsion reactor comprising
   a movable support means adapted to receive a jet reactor to be tested,
   a forcer for resisting movement of said jet reactor,
       said forcer including a first portion connected to said reactor and movable therewith, and a second portion,
           said first portion being movable relative to said second portion,
   inertial reference means for cancelling the effect of vibrations other than those directly induced by said jet reactor,
       said inertial reference means including a mass movable in the same direction as said support means,
   and servo means
       for holding said first portion in a relatively stationary position and determining the force necessary for so holding said first portion, said servo means including error signal generating means comprising a reference part connected to said inertial reference means, and means for manifesting the magnitude of said force.

2. A device as recited in claim 1 in which said mass included in said inertial reference means is a lightly damped seismic mass.

3. A device as recited in claim 1 including in addition means for moving said second portion of said forcer so as to maintain the relative positions of said first and second portions
   for providing said first portion with a relatively long range of movement with respect to adjacent stationary objects, and a relatively short range of movement relative to said second portion.

4. A device as recited in claim 3 including in addition means for applying to said forcer a predetermined force during said movement of said second portion of said forcer.

5. An arrangement for measuring the performance of a jet propulsion reactor comprising
   a support means for supporting said jet reactor,
       said support means being movable in response to the reaction of said jet reactor,
   an armature,
       said armature including winding means for carrying a current and thereby producing a magnetic field, and being connected to said movable support means and movable therewith,
   a field means cooperable with said armature,
       said field means having a substantially constant magnetic field capable of reacting with the magnetic field of said armature for providing a resisting force to resist the force of said jet reactor,
   an inertial reference,
   a position transducer,
       said position transducer including a movable portion carried by said armature, and a reference portion carried by said inertial reference,
   and servo loop means for varying the current in said armature to maintain said armature relatively stationary with respect to said field as a result of an error signal from said position transducer.

6. A device as recited in claim 5 in which
   said inertial reference comprises a relatively heavy mass,
   and relatively friction-free bearing means supporting said mass,
       whereby said mass is free from external vibrational forces above those of relatively low amplitude.

7. A device as recited in claim 5 including in addition signal generator means selectively connectable to said armature for producing in said armature an oscillating current of predetermined frequency
       for thereby causing said armature to impose upon a reactor under test an oscillatory force,
   and means for selectively notch filtering said frequency from said servo loop.

8. A device for measuring the performance of a jet propulsion reactor comprising
   a movable support means for a jet propulsion reactor,
   a forcer,
       said forcer including a first portion connectable to said reactor and movable therewith, and a second portion adjacent said movable portion,
           said first portion including means for generating an electromagnetic field, said second portion including means for generating a magnetic field capable of interaction with said electromagnetic field for imposing a force on said movable portion for resisting the force generated by said jet reactor,
   an inertial reference,
   a position transducer,
       said position transducer including a movable portion connected to said movable portion of said forcer and a reference portion carried by said inertial reference,
   and servo loop means for applying the error signal from said position transducer to said electromagnetic field of said first portion of said forcer
       for controlling the strength of the field thereof and causing said interacting fields to balance the force of said jet reactor.

9. A device as recited in claim 8 including in addition
means for applying to said forcer a zero average oscillatory force of predetermined frequency and magnitude,
means for notch rejection filtering said servo loop means with respect to the frequency of said oscillatory force,
and acceleration sensing means mounted for sensing the acceleration of said jet reactor during the movement of said jet reactor from said oscillatory force for permitting determination of the mass of said jet reactor.

10. A device as recited in claim 8 in which
said inertial reference includes a mass, and means supporting said mass with freedom for translational movement relative to it adjacent environment,
said reference portion of said transducer being carried by said mass.

11. A device as recited in claim 8 including in addition
means connected to said forcer for moving said forcer away from said movable support means,
for allowing a jet reactor to move on said movable support means through a relatively long stroke.

12. A device as recited in claim 11 in which
said means for moving said forcer includes means for maintaining said first portion and said second portion of said forcer in a substantially fixed relative relationship.

13. A device as recited in claim 11 in which
said means for moving said forcer includes a servo loop,
said servo loop having signal generating means for generating an error signal upon relative movement of said first portion and said second portion of said forcer,
whereby said portions of said forcer are maintained in a substantially fixed relative relationship upon movement of said forcer.

14. An arrangement for testing a jet reaction propulsor comprising
a relatively friction-free movable support for supporting a propulsor,
an armature connected to said movable support and movable with a propulsor supported thereby, variable electrical energy supply means for producing a variable current in winding affixed to said armature and thereby producing a variable magnetic field,
a field producing device associated with said armature,
said field producing device producing a constant magnetic field cooperable with said magnetic field of said armature for providing a force to resist a force produced by said propulsor,
a seismic mass,
said seismic mass including a relatively heavy weight, and a relatively friction-free support means for said weight for thereby allowing relative movement between said weight and its surroundings,
a position transducer,
said transducer having a movable portion connected to said armature
and a reference portion carried by said weight, said position transducer being connected to said electrical energy supply means and upon displacement of said movable portion thereof generating a signal for controlling said electrical energy supply means for maintaining said armature in a substantially fixed null position,
and a support for said field,
said support for said field being movable through a relatively long stroke for permitting appreciable translation of said propulsor on said movable support therefor.

15. A device as recited in claim 14 including in addition
a second position transducer
having a movable portion connected to said armature and a reference portion carried by said field,
and means controlling the movement of said support for said field connected to and controlled by said second position transducer
for maintaining said armature and field in a substantially fixed relationship during movement of said field.

References Cited
UNITED STATES PATENTS

| | | | |
|---|---|---|---|
| 2,593,906 | 5/1952 | Markson | 73—141 X |
| 2,814,768 | 11/1957 | Kinkel | 73—141 X |
| 3,038,331 | 6/1962 | Henry et al. | 73—116 |
| 3,148,530 | 9/1964 | Woods | 73—71.6 X |

JAMES J. GILL, *Primary Examiner.*

JERRY W. MYRACLE, *Assistant Examiner.*